No. 864,905. PATENTED SEPT. 3, 1907.
A. J. MORSE.
TRANSMISSION GEARING.
APPLICATION FILED JUNE 13, 1906.

2 SHEETS—SHEET 1.

WITNESSES:
Frank O'Connor
M. G. Crawford

INVENTOR
A. J. Morse
BY
Fred T. Benjamin
ATTORNEY

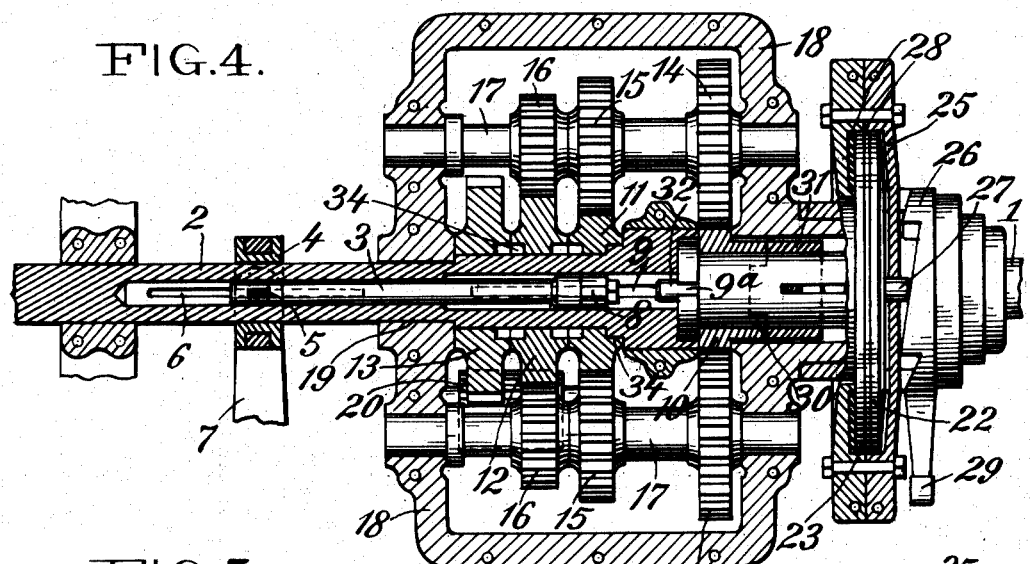
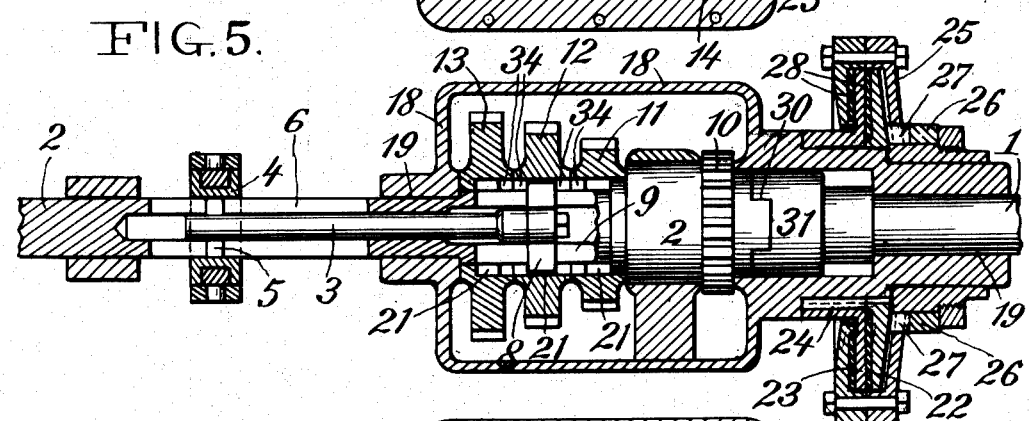
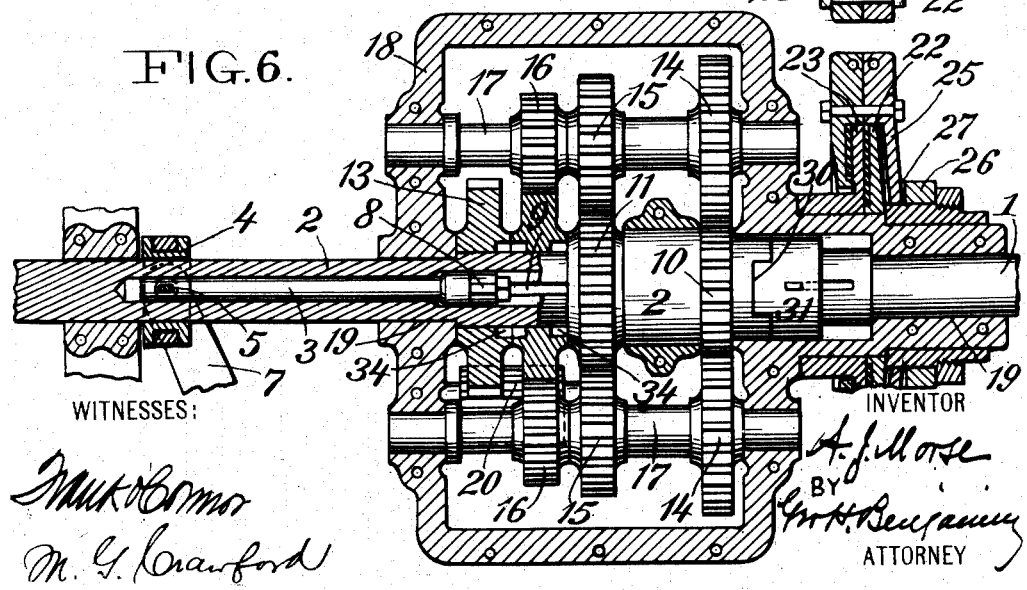

UNITED STATES PATENT OFFICE.

ARTHUR JACOB MORSE, OF TORRINGTON, CONNECTICUT, ASSIGNOR OF ONE-HALF TO ADELBERT P. HINE, OF TORRINGTON, CONNECTICUT.

TRANSMISSION-GEARING.

No. 864,905.  Specification of Letters Patent.  Patented Sept. 3, 1907.

Application filed June 13, 1906. Serial No. 321,471.

*To all whom it may concern:*

Be it known that I, ARTHUR JACOB MORSE, a citizen of the United States, residing at Torrington, county of Litchfield, State of Connecticut, have invented certain new and useful Improvements in Transmission-Gearing, of which the following is a specification.

My invention relates to transmission gearing of the changeable speed class, and, as herein embodied, is adapted particularly for use in connecting driving and driven shafts, as in motor vehicles, for example, where complete control and regulation of the power transmitted is desired without varying the speed of the motor.

Transmission gearing of the same general character as that herein shown is described in several of my prior applications, as follows: Serial No. 290,662, filed December 6, 1905, and Serial No. 301,860, filed February 19, 1906. In the earlier of these applications, the arrangement of the mechanism is such that high speed transmission is necessarily accompanied by rotation of the gear casing. This I find objectionable in some instances, as the momentum acquired by such a heavy body rotating at a high speed, is ordinarily sufficient, if suddenly checked by the gears becoming obstructed or locked, to strip, fracture or otherwise injure the same. In the later application, this and other objections are obviated through a re-arrangement of parts, etc., which permits high speed transmission without motion of either the gears or the gear case, and while the results obtained are much more satisfactory from a mechanical standpoint, it is found that the strength and durability of the mechanism may be greatly increased, the cost of manufacture materially reduced and other important advantages obtained by substituting standard spur gearing for the special design of bevel gears shown in the applications referred to. The present invention is, therefore, designed with this object in view.

The accompanying drawings will serve to illustrate mechanism suitable for carrying my invention into effect.

Figure 1:
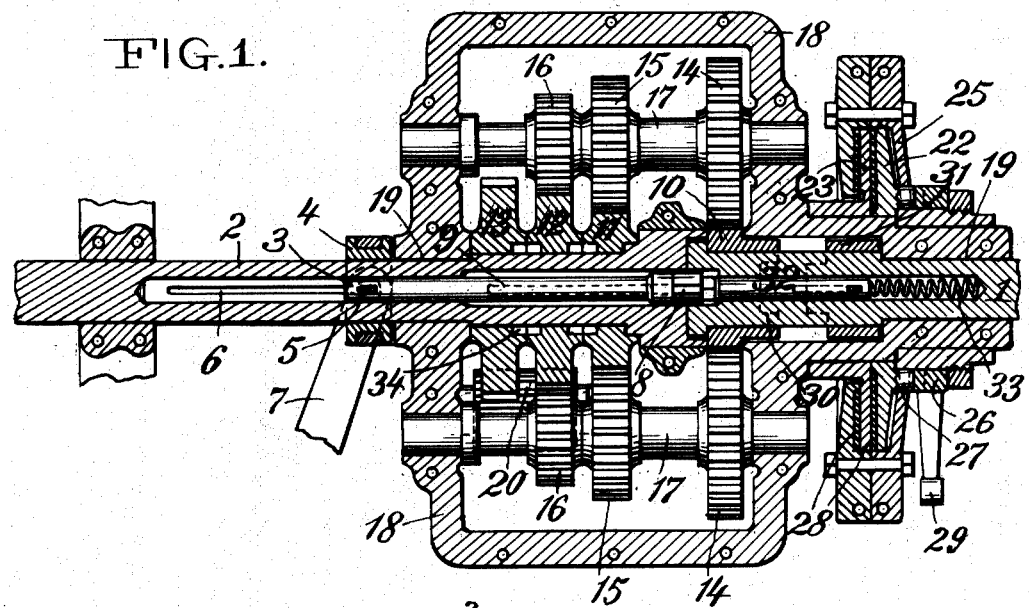
Figure 2:
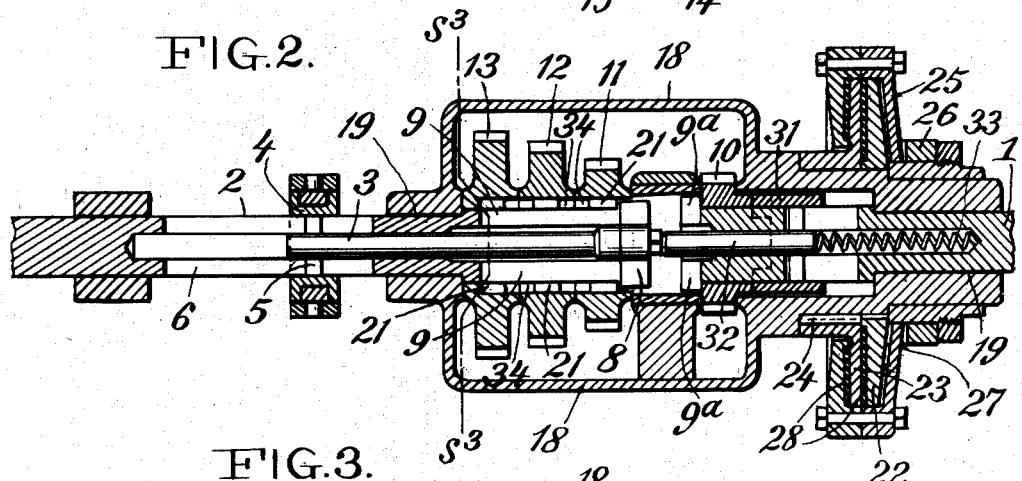
Figure 3:
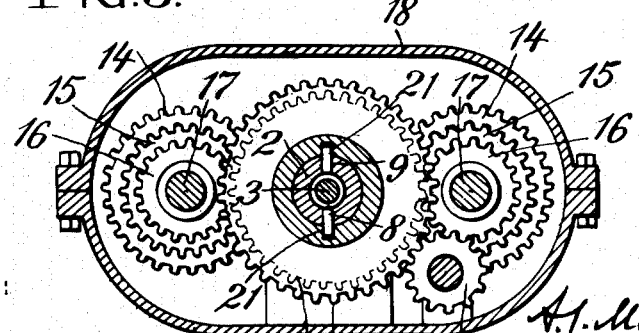

In the drawings: Figure 1, is a longitudinal section showing the gearing adjusted for direct transmission from the driving shaft to the driven shaft. Fig. 2, is a similar view, taken at right angles to the plane of Fig. 1, showing the shafts disconnected. Fig. 3, is a cross-section on the line $s^3$, $s^3$, of Fig. 2. Fig. 4, is a view similar to Fig. 1, showing the controlling clutch in position to connect the driving and driven shafts through the intermediate speed gears. Fig. 5, is a longitudinal section taken at right angles to the plane of Fig. 4, showing the driving and driven shafts connected through the low speed gears, and Fig. 6, shows the final adjustment of the clutch to reverse the direction of rotation of the driven shaft, the speed reduction being about the same as in Fig. 5.

In the present embodiment of the invention, the driving and driven shafts are shown separately and independently rotatable, and as arranged, may be coupled in driving relation and given motion in the same direction or in opposite directions, and at the same speed or at different speeds, as desired. The speed of rotation of the driving shaft determines the highest speed the gearing is designed to transmit, and when, therefore, the driven shaft is to be rotated at such speed, it is coupled direct. For the transmission of any speed below that of the driving shaft, reducing gears are employed; but it will be understood this particular arrangement is designed to serve herein for purposes of illustration only, as it will be obvious from the following description, that the substitution of multiplying or other gears for reducing gears could be readily effected without departing from the principle of operation involved.

Referring now to the drawings: 1 represents the driving shaft, and 2 the driven shaft. These shafts mounted in any approved manner, are arranged end to end and the driven shaft is bored out to receive a rod, 3, which is movable back and forth by means of a sliding collar, 4, upon the shaft. The collar is secured to the rod by pin, 5, passing through slots, 6, in the shaft, and is grooved in the usual manner to coöperate with the forked end of a lever, 7, or other device by which it may be given movement. For the direct coupling of the shafts, the rod has secured at or near its end, opposite that to which the sliding collar, 4, is attached, a cross-pin, 8, which projects through oppositely disposed slots, 9, in the shaft 2, and is movable in and out of locked relation with notches, 10, formed in the adjoining end of the driving shaft.

In Fig. 1, the shafts are shown coupled by the cross-pin 8 for direct transmission, the pin being centered relatively to the line of their abutting ends and engaging the registering slots and notches thereof.

In Fig. 2, the cross-pin 8 is shown as lying wholly within the slots of the driven shaft, and being thus disconnected, the shafts may be rotated independently at different speeds, permitting transmission from one to the other through the gearing.

It will thus be seen that a full movement of the rod toward the right, as in Fig. 2, serves to connect the shafts for high speed transmission, and a reverse movement of the rod disconnects them, permitting independent rotation thereof.

When the driven shaft is to be rotated in either direction at a lower speed than that of the driving shaft, transmission, as above stated, is effected through reducing gearing, which will now be described.

Upon the shaft 1, a gear 10, is mounted, and free to turn upon the shaft 2 there are three gears, 11, 12 and 13. These gears 10, 11, 12, 13, are permanently connected in driving relation by the interposed reducing gears 14, 15, 16, two sets of which are preferably employed as shown, to equalize the strain and give greater strength, but so far as the transmission of power is concerned, one set only is required. The gears 14, 15 and 16 of each set are keyed or otherwise secured upon a shaft 17, which is mounted to turn freely in suitable bearings formed in the gear casing 18. The casing 18 is preferably made up of separable sections in the usual manner, and has a terminal bearing 19, upon each of the shafts about which it is free to turn.

With the parts adjusted as in Fig. 2, rotation of the shaft 1, carrying the gear 10, will give motion through the gears 14, 15 and 16 to the gears 11, 12 and 13, causing the gears 11 and 12 to turn in one direction and the gear 13 driven through an intermediate 20, in the opposite direction. In order now that such motion may be transmitted to the driven shaft, each of the gears 11, 12 and 13 is provided with oppositely disposed keyways 21, with which the projecting ends of the cross-pin 8 are brought into engagement by movement of the rod 3, the effect of which is to lock the gear engaged, in driving relation with the driven shaft.

In Fig. 2, the position of the rod 3 is such that the cross-pin is shifted clear of the gears 11, 12, and 13, and thus adjusted motion is transmitted from the driving shaft, through the gear 10, reducing gears 14, 15, and 16, to the driven gears 11, 12 and 13, but no motion is transmitted to the driven shaft 2. If, now, the rod 3 is shifted toward the left until the cross-pin enters the keyways of either the gear 11, as in Fig. 4, or the gear 12, as in Fig. 5, the shaft 2 will be coupled in driving relation with one or the other of these gears and will, therefore, rotate at intermediate or low speed, depending upon which of the gears 11 and 12 is engaged. It will also be seen that the further shifting of the rod 3 toward the left until the cross-pin carried thereby interlocks with the gear 13, as in Fig. 6, will result in coupling the shaft 2 in driving relation and giving it motion in a reverse direction.

When motion is transmitted through one of the gears 11, 12 and 13, as just described, any load upon the driven shaft in excess of the total resistance offered by the weight and friction of the engaging parts of the gearing, will oppose rotation of this shaft, and unless checked, the tendency would be for the gear casing and reducing gears mounted thereon to revolve about the driven gears, and the driving shaft to come to rest.

In order to counter-balance the load upon the driven shaft, a suitable friction device is employed, comprising two members, 22, 23, one of which is keyed to the gear casing, as indicated at 24, and the other mounted free to turn thereon. These members are inclosed in a sectional non-rotatable casing, 25, and are moved in and out of effective engagement by means of a cam, 26, which coöperates with studs 27, of a loose member of the friction device, such studs projecting through openings in the side of the casing, as shown in Figs. 5 and 6. One or both members of the friction device may be faced with leather or other material, as indicated at 28, or otherwise formed if desired. The cam 26 may be given motion through any suitable lever connection, such as that indicated at 29, to throw the friction on or off and hold the gear casing from rotation or permit rotation thereof at any speed desired. A controlling device is thus provided which is effective at all times to vary the speed of the driven shaft without requiring a re-adjustment of the clutch.

Assuming, for example, that the shaft 2 is being driven in the same direction as the driving shaft, at a 2 to 1 reduction in speed, as indicated in Fig. 4, if, now, it is desired to further reduce the speed of the driven shaft, the cam is rotated toward the left, through the lever connection above referred to, permitting more or less slip between the members of the friction device, and thereupon the gear casing and reducing gears carried thereby revolve about the driven gears, which results in a reduction in the speed of the driven shaft. This movement of the cam may be continued until the speed of the rotation of the gear casing equals that of the gear 10, and as there would then be no transmission of power to the driven shaft, the latter would cease to rotate. Obviously, therefore, by shifting the cam, first in one direction, then in the other, any desired change in the speed of the driven shaft may be obtained, and upon again throwing on the friction, the gearing will become effective and the shaft will resume its rotation at a 2 to 1 reduction in speed for which it was assumed to be set.

Referring now to Fig. 1: When the shafts, as shown, are coupled direct for the transmission of high speed, it is desirable that the driving gear 10 should run free, as otherwise there would be motion throughout the entire train of gears, which would run idly at high speed without performing any useful function. For the purpose, therefore, of disconnecting the gear 10 from the driving shaft, at such times, it is loosely mounted thereon and its hub is notched, as indicated at 30, to coöperate with a sliding sleeve collar 31, which is mounted upon the driving shaft and secured to a pin 32, spring seated in the tubular end of the shaft. As arranged, the spring 33, acts to advance the clutch sleeve and lock the gear in driving relation upon the shaft, and the disengagement thereof is effected by the rod 3, which, when shifted to the limit of its movement toward the right, strikes the projecting end of the pin 32, and moves the same in opposition to the spring until the clutch sleeve is clear of the gear. With the gear thus disengaged and the friction thrown in the shafts will be coupled direct as in Fig. 1 for high speed transmission without motion being imparted to either the gearing or the gear casing.

For convenience in connecting and disconnecting the driving gears 11, 12 and 13, the adjoining faces thereof are counter-bored, as indicated at 34, and such counter-bored portions combine to form annular grooves of suitable size to receive the cross-pin 8, which, when lying in one of such grooves, may, by a slight movement of the rod 3, be caused to lock either of the adjoining gears in driving relation upon the shaft.

It will be observed that the various adjustments above described are made without disengaging the gears; also that the speed and direction of rotation of the driven shaft is at all times under complete control.

Having thus described my invention, I claim:

1. A power transmitter comprising a driving member, a driven member, gearing interposed between the driving member and the driven member including a plurality of sets of speed changing gears arranged on parallel axes, a clutch device controlling direct transmission from one member to the other, the connection of the gears with the driving shaft and indirect transmission through the gears, and means for varying the speed of the gears.

2. A power transmitter comprising a driving member, a driven member, gearing interposed between the driving member and the driven member, including a plurality of sets of speed changing gears arranged on parallel axes, a clutch device controlling direct transmission from one member to the other and indirect transmission through the trains, and means independent of the driving member for varying the speed of the gears.

3. A power transmitter comprising a driving member, a driven member, a plurality of speed-changing spur-gears interposed between the driving member and the driven member and permanently arranged in intermeshing relation, a clutch device controlling direct transmission from one member to the other and indirect transmission through the gears, and means independent of the driving member for varying the speed of the gears.

4. A power transmitter comprising a driving member, a driven member, a train of spur-gears interposed between the members, said train comprising a planetary gear, a clutch device controlling direct transmission from one member to the other and the disconnecting of the gears from the members and indirect transmission through the train, and means for varying the effective speed of rotation of the planetary gear.

5. A power transmitter comprising a driving member, a driven member, gearing interposed between the driven member and the driving member including a plurality of sets of speed-changing gears arranged on parallel axes, each set of speed-changing gears comprising a planetary gear, a clutch device controlling direct transmission from one member to the other and indirect transmission through the trains, and means common to the several planetary gears for varying the effective speed of rotation thereof.

6. A power transmitter comprising a driving member, a driven member, gearing comprising spur-gears interposed between the members, clutch devices coöperating with the terminal gears of the gearing, operating means common to the several clutch devices, and independent means for controlling transmission through the gearing.

7. A power transmitter comprising a driving member, a driven member, gearing interposed between the members, comprising spur-gears on an auxiliary shaft, certain of the gears being movable in planetary relation to the members, a clutch device controlling direct transmission from one member to the other and the disconnection of the gears from the members and indirect transmission through the gearing, and means for frictionally controlling the movement of the planetary gears.

8. A power transmitter comprising a driving member, a driven member, gearing interposed between the members comprising spur-gears, a rotatable casing in which certain of the gears are mounted and movable in planetary relation to the members, a variable resistance device coöperating with the casing, and a clutch device controlling direct transmission from one member to the other and indirect transmission through the gearing.

9. A power transmitter comprising a driving member, a driven member, gearing connecting the driven member with said driving member including a plurality of sets of speed-changing gears arranged on parallel axes, each set including a planetary gear, and means common to the several sets of planetary gears for retarding in varying degree the orbital motion of the planetary gears.

10. A power transmitter comprising a driving member, a driving gear thereon, a driven member, gearing connecting the driven member with said driving gear including a plurality of sets of speed-changing gears arranged on parallel axes, each set including a planetary gear, the gears of each speed-changing set being permanently mounted in intermeshing relation, and means common to the several sets of planetary gears for retarding in varying degree, the orbital motion of the planetary gears.

11. A power transmitter comprising a driving member, a driving gear thereon, rotatable shafts connected thereto, a driven member, gearing arranged in changeable speed trains connecting said shafts and the driven member, and means common to the several trains for varying the power transmitted without disengaging the gears thereof.

12. A power transmitter comprising a driving member, a driving gear thereon, a rotatable shaft connected thereto, a driven member, gearing arranged in changeable speed trains connecting said shaft and the driven member, the gears of the trains being permanently mounted in intermeshing relation, and means common to the several trains for varying the power transmitted.

13. A power transmitter comprising a driving member adapted to rotate continuously at maximum speed, a driving gear thereon, a rotatable shaft connected thereto, a driven member, gearing arranged in changeable speed trains connecting said shaft and the driven member, the gears of each train being permanently mounted in intermeshing relation, and means common to the several trains for varying the effective speed of rotation of certain gears thereof.

14. A power transmitter comprising a driving member, transmitting gears connected therewith, a driven member, gearing arranged in trains connecting the driven member with said transmitting gears, certain gears of each train being movable in planetary relation to the gears with which they intermesh, and means common to the several planetary gears for controlling the planetary movement thereof.

15. A power transmitter comprising a driving member, transmitting gears connected therewith, a driven member, gearing arranged in changeable speed trains comprising planetary gears and connecting the driven member with said transmitting gears, and a common controlling means for varying the effective speed of rotation of the several planetary gears.

16. A power transmitter comprising a driving member, transmitting gears connected therewith, a driven member, gearing comprising planetary gears permanently arranged in intermeshing relation between and connecting the driven member with said transmitting gears, and means independent thereof for reversing the direction of rotation of the driven member.

17. A power transmitter comprising a driving member, a driven member, mechanism for transmitting motion from the driving member to rotate the driven member at different speeds in either direction, said means including reducing spur-gears movable in planetary relation to said members and whose effective speed of rotation is variable, and means for directly connecting the members and disconnecting said mechanism from the driving member.

18. A power transmitter comprising a driving member, a driven member, mechanism for transmitting motion from the driving member to rotate the driven member at different speeds in either direction comprising a gear loosely mounted upon each of the members, clutch devices coöperating therewith, interposed spur-gears meshing with the driving and driven members and movable in planetary relation thereto, and means for varying the effective speed of rotation of said interposed gears.

19. A power transmitter comprising a driving member, a driven member, a train of spur-gears connecting the members, the terminal gears of said train being loosely mounted upon said members, requisite clutch devices controlling said terminal gears, and means for varying the effective speed of rotation of the intermediate gears during transmission of power through the train.

20. A power transmitter comprising a driving member, a driven member, a train of spur-gears connecting the members, the terminal gears of the train being mounted upon said members, requisite clutch mechanism coöperating with the terminal gears, and controlling means by which the intermediate gears may be given a variable speed of rotation during transmission of power through the train.

21. A power transmitter comprising a driving member, a driven member, transmission gearing comprising spur-gears for rotating the members in the same direction or in opposite directions, and clutch devices coöperating with the gears, a single controlling device common to the clutch devices, and means for varying the effective speed of rotation of certain of the gears during transmission.

22. A power transmitter comprising a driving member, a driven member, a train of reducing spur-gears connecting the members, the terminal gears of the train being loosely mounted upon said members and the intermediate gears movable in planetary relation thereto, requisite clutch devices coöperating with the terminal gears, and means for varying the effective speed of rotation of the intermediate gears.

23. A power transmitter comprising a driving member, transmitting gears connected therewith, a driven member, gearing connecting the driven member and said transmitting gears, said gearing being arranged in trains driven from said transmitting gears and terminating respectively in a gear upon the driven member, a clutch device co-acting with the several terminal gears upon the driven member, and means independent of the clutch for varying the effective speed of rotation of certain of the gears of the trains.

24. A power transmitter comprising a driving member, transmitting gears connected therewith, an independently rotatable driven member, a clutch device controlling direct connection between the members, gearing arranged in trains connecting the transmitting gears with the driven member for the transmission of power from one to the other, and a common controlling means co-acting with certain gears of the several trains for varying the speed of the driven member.

In testimony whereof, I affix my signature, in the presence of two witnesses.

ARTHUR JACOB MORSE.

Witnesses:
W. H. PUMPHREY,
CHARLES D. GREEN.